United States Patent
Organ et al.

(10) Patent No.: US 8,955,592 B2
(45) Date of Patent: Feb. 17, 2015

(54) GREASE DELIVERY SYSTEM

(71) Applicant: Vetco Gray Controls Limited, Bristol (GB)

(72) Inventors: Mark Organ, Bristol (GB); Peter Davey, Bristol (GB); Graeme Thomson, Vancouver (CA)

(73) Assignee: Vetco Gray Controls Limited, Nailsea (GB)

( * ) Notice: Subject to any disclaimer, the term of this patent is extended or adjusted under 35 U.S.C. 154(b) by 0 days.

(21) Appl. No.: 13/718,889

(22) Filed: Dec. 18, 2012

(65) Prior Publication Data

US 2013/0161019 A1  Jun. 27, 2013

(30) Foreign Application Priority Data

Dec. 22, 2011 (EP) .................................. 11195123

(51) Int. Cl.
| F16N 11/10 | (2006.01) |
| E21B 41/00 | (2006.01) |
| E21B 33/072 | (2006.01) |
| E21B 33/076 | (2006.01) |
| E21B 33/08 | (2006.01) |
| F16N 17/00 | (2006.01) |

(52) U.S. Cl.
CPC .............. *E21B 41/00* (2013.01); *E21B 33/072* (2013.01); *E21B 33/076* (2013.01); *E21B 33/08* (2013.01); *F16N 17/00* (2013.01); *F16N 11/10* (2013.01)
USPC ......................................................... 166/335

(58) Field of Classification Search
CPC ...... E21B 19/00; E21B 33/068; E21B 33/076
USPC .............. 166/335, 350, 84.2, 385, 72.1, 245; 137/605, 606; 222/144.5, 145.7; 184/6, 184/6.1

See application file for complete search history.

(56) References Cited

U.S. PATENT DOCUMENTS

| 4,840,018 A | 6/1989 | Deutsch |
| 2009/0151956 A1 | 6/2009 | Johansen |
| 2011/0094731 A1* | 4/2011 | Crawford ..................... 166/84.2 |

FOREIGN PATENT DOCUMENTS

| DE | 19623175 A1 * | 12/1997 |
| GB | 2233365 A | 1/1991 |
| WO | 2008147216 A2 | 12/2008 |

OTHER PUBLICATIONS

European Search Report dated May 9, 2012 issued in connection with EP Application No. EP11195123.2.

* cited by examiner

*Primary Examiner* — Matthew Buck
*Assistant Examiner* — Patrick Lambe
(74) *Attorney, Agent, or Firm* — GE Global Patent Operation

(57) ABSTRACT

A grease delivery system for delivering grease to a location is provided. The grease delivery system comprises: a first grease reservoir having a first grease output and a first output device configured to output grease from the first grease reservoir; a second grease reservoir having a second grease output and a second output device configured to output grease from the second grease reservoir; and a common grease output for delivering grease to the location, wherein the common grease output is fluidly connected to the first and second grease outputs, wherein the system is configured to simultaneously output grease from the first and second grease reservoirs to the common grease output.

18 Claims, 2 Drawing Sheets

GREASE DELIVERY SYSTEM

BACKGROUND OF THE INVENTION

Embodiments of the present invention generally relate to a grease delivery system, and more particularly, to a well intervention module, an underwater hydrocarbon extraction facility comprising such a grease delivery system, and a method of delivering grease to a location.

It is well known that when performing wire-line intervention operations at underwater facilities, for example subsea hydrocarbon extraction facilities incorporating at least one hydrocarbon production well, it is necessary to inject high pressure grease into an intervention pressure control head during the wire-line operations in order to lubricate the line and provide a seal against ingress of well fluids. Previous grease injection attempts made use of a grease supply from the surface (i.e. the top-side), which was pumped subsea to the facility. However it is understood that this approach encountered grease control and response issues. For example, the viscosity of the grease is highly temperature dependent, and since the grease is pumped a long distance subsea, the ambient temperature will vary significantly over the distance, which complicates control.

To avoid such grease control and response issues, it is optimal to control the grease supply locally to the injection point. In other words, a supply of grease is stored subsea, thus avoiding temperature differential problems, and applied directly where needed. A problem arises with such a system however such that only relatively small quantities can be stored subsea, typically in grease tanks. Since the grease supply must remain as constant as possible, it is advantageous to provide a system whereby switchover from one tank to another (for example, a replacement tank) may be as seamlessly performed as possible, with any grease flow interruption minimized. US 20110094731 A1 describes such a local grease injection system, which performs switchover using near-instantaneous switching of hydraulic control valve(s) located in the grease supply line between the tank(s) and the injection point.

While that system itself provides advantages over the previous top-side grease supply methods, it does suffer from a number of problems. For example, the system is reliant on reliable and instantaneous switching of the hydraulic valves; if this fails then the system may be severely compromised. Furthermore, while the switching is near instantaneous, small gaps in the flow may still occur even during fault-free operation.

BRIEF DESCRIPTION OF THE INVENTION

According to an embodiment of the present invention, a grease delivery system for delivering grease to a location is provided. The grease delivery system comprises: a first grease reservoir having a first grease output and a first output device configured to output grease from the first grease reservoir; a second grease reservoir having a second grease output and a second output device configured to output grease from the second grease reservoir; and a common grease output for delivering grease to the location, wherein the common grease output is fluidly connected to the first and second grease outputs, wherein the system is configured to simultaneously output grease from the first and second grease reservoirs to the common grease output.

According to another embodiment of the present invention, a well intervention module is provided. The well intervention module comprises a grease delivery system in accordance with the grease delivery system embodiment, wherein the well intervention module is configured for attachment to an underwater hydrocarbon extraction facility.

According to another embodiment of the present invention, an underwater hydrocarbon extraction facility is provided. The underwater hydrocarbon extraction facility comprises the grease delivery system embodiment.

According to another embodiment of the present invention, a method for delivering grease to a location using a grease delivery system is provided. The grease delivery system comprising a first grease reservoir having a first grease output and a first output device configured to output grease from the first grease reservoir, a second grease reservoir having a second grease output and a second output device configured to output grease from the second grease reservoir, and a common output for delivering grease to the location, wherein the common output is fluidly connected the first and second grease outputs. The method comprising: outputting grease from the first reservoir through the first grease output; outputting grease from the second reservoir through the second grease output; and simultaneously outputting grease from each of the first and second reservoirs to the common output for a period of delivery.

BRIEF DESCRIPTION OF THE DRAWINGS

The invention will now be described with reference to the accompanying drawings, of which.

DETAILED DESCRIPTION OF THE EXEMPLARY EMBODIMENTS OF THE INVENTION

According to embodiments of the present invention, a grease delivery system provides independent grease supplies and enables grease output from these supplies to be simultaneously provided during cylinder switch-over, and/or by using grease control valves.

According to some embodiments of the present invention, use two or more grease cylinders, with only one cylinder supplying grease at any one time, until cylinder supply switch-over. At this point, the supply is output simultaneously with that of a second cylinder for a period of time (t).

It is possible that the simultaneous grease output may enable co-mingling of the grease from these outputs.

Embodiments of the present invention are suited, in particular, to supply grease to a pressure control head of intervention equipment (for example, an intervention module) for use at an underwater hydrocarbon extraction facility during intervention operations. The pressurised grease enables lubrication of line and maintains a sealed well. Alternatively, the invention may be used for any other application requiring grease delivery to a location.

Figure 1:
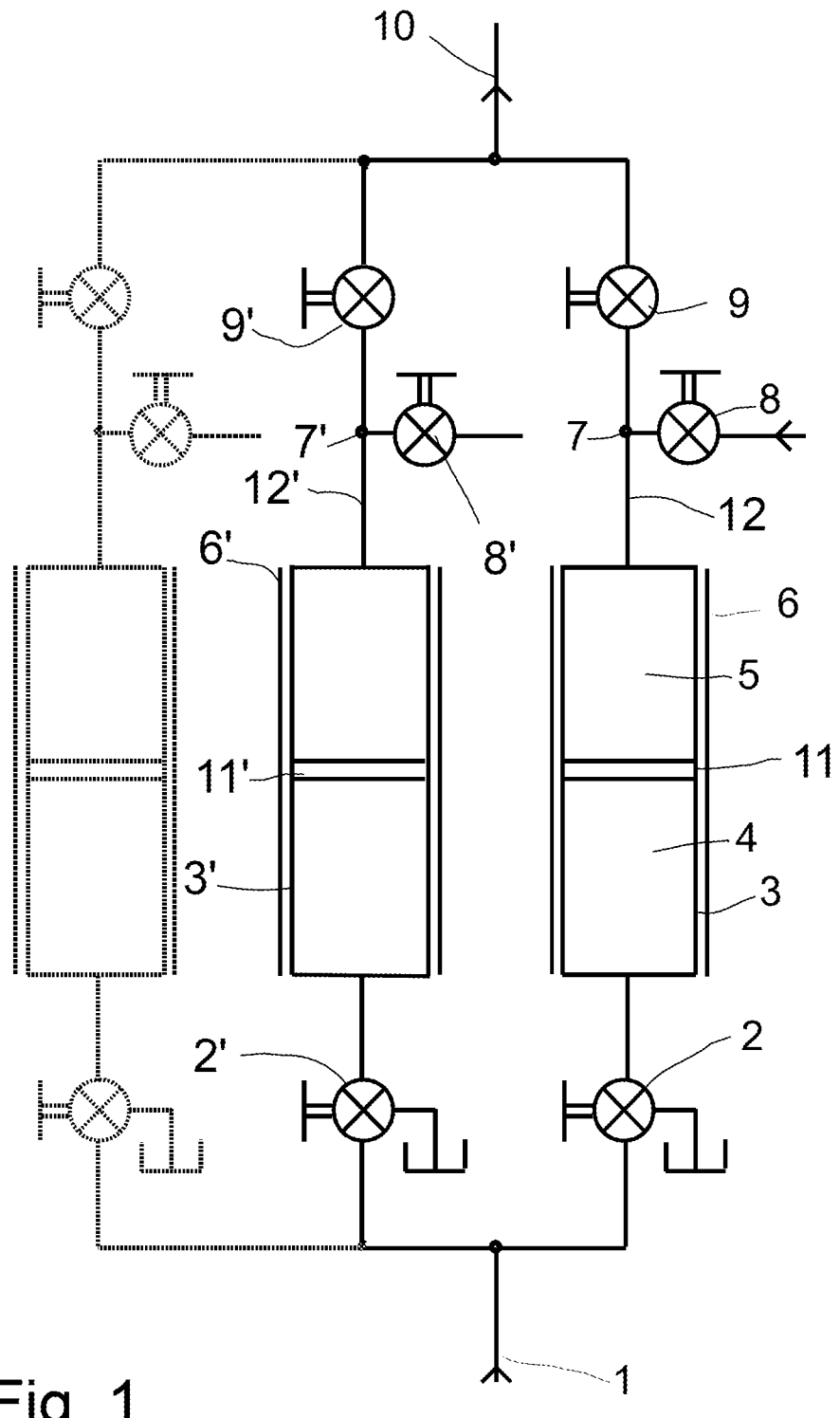
FIG. 1 is a schematic illustration of a grease delivery system using grease control valves according to an embodiment of the present invention.

FIG. 1 schematically shows an embodiment, where grease control valves are used to control switch-over. For simplicity, FIG. 1 omits certain details of the control arrangement, e.g. mechanisms for receiving signals from sensing means 6, but instead only shows details of the hydraulic fluid/grease delivery system. Such control elements may be effected in any standard manner, for example, by electronic or electrical control signals sent to a control module, which may be located either subsea or at the surface, or via hydraulic control systems. Suitable control systems per se are known by those skilled in the art and thus, further details are not provided. A hydraulic fluid supply 1 provides hydraulic fluid to a first grease reservoir, in this case a cylinder 3 via a hydraulic supply function valve 2, which is operable in a first, open configuration to supply hydraulic fluid to the cylinder 3, and in a second return configuration to return hydraulic fluid back to the source. In a particular embodiment, the valve may comprise a block and bleed valve, i.e. such that the valve may be additionally operable to block hydraulic fluid flow there through in both directions. For example, the source may comprise a local single hydraulic fluid cylinder (not shown) or a supply from an umbilical cable. In this embodiment, valve 2 is configured to be operable by a remotely operable vehicle (ROV), such as a remote-controlled submarine craft. This hydraulic fluid supply is operable causing grease to output from the cylinder 3 by supplying hydraulic fluid to cylinder 3 to displace grease therefrom. In more detail, cylinder 3 includes a movable piston 11 which divides the cylinder 3 into two chambers, the lower one (as shown) for receiving hydraulic fluid 4, and the upper one for receiving grease 5. Cylinder 3 is provided with a sensing means 6 for detecting the quantity of grease 5 within the cylinder 3, which may take various forms, for example a limit switch or position sensor. A hot stab injection point 7 is located at a reservoir output line 12 from the upper chamber, for enabling grease to be injected into the system for replenishment. Hot stabs enable a remotely operable vehicle (ROV—not shown) to stab a line into point 7, i.e. male and female interlocking members are provided, one of which is located at 7, the other being carried by an ROV. FIG. 1 shows a valve mechanism 8 connected to point 7, which represents the fact that the hot stab effectively functions as a valve which is closed if no stab has occurred, but open if a stab is in progress. For example, the replenishing grease injected at point 7 may be provided from a locally-stored grease tank (not shown), or a tank which is carried by an ROV. A grease control valve 9 (in this embodiment hydraulically-piloted) is provided in the reservoir output line 12 past the injection point 7, for controlling grease flow through the output line 12, operable to selectively allow or block grease flow there through. Output line 12 leads to common grease output 10, for deployment at a location as required, at the pressure control head of the intervention equipment for example.

In FIG. 1, an additional grease injection cylinder module is shown in parallel to the first module described above, having similar components, the module including a hydraulic supply function valve 2', a second grease reservoir i.e. cylinder 3' with movable piston 11' creating two chambers for hydraulic fluid and grease respectively, sensing means 6', injection point 7' (with associated valve 8'), grease control valve 9' and reservoir output line 12'. Output line 12' leads to common grease output 10. The dashed lines show an optional additional grease injection cylinder module, in practice the number n of such modules may be chosen to suit the particular application, with the proviso that at least two modules in total are required so as to enable cylinder switch-over. Each cylinder comprises similar components as the first two described above, with the cylinder's respective output line leading to the common grease output 10.

The normal mode of operation is as follows, where for simplicity only a two cylinder (3, 3') arrangement is described: hydraulic supply function valve 2 is opened by ROV to route hydraulic fluid from supply 1 to cylinder 3 under pressure. Conveniently, valve 2' is also opened by ROV at this time; grease control valve 9 is hydraulically opened to allow grease flow through output line 12 (with grease control valve 9' remaining closed), (the above described steps may be effected in either order); the pressurised hydraulic fluid 4 in the cylinder 3 causes grease 5 to be delivered under pressure past injection point 7, through open grease control valve 9, and onward to common grease output 10, to be deployed as required; when sensing means 6 indicates that the grease level remaining in cylinder 3 is low, the grease control valve 9' on a second grease cylinder supply line is hydraulically opened; for a period of delivery, grease is simultaneously supplied to common grease output 10 from both cylinders 3 and 3' to ensure a seamless supply of grease; the grease control valve 9 is closed when any one of the following conditions applies: the grease level of first cylinder 3 is exhausted, detected by sensing means 6, the grease level of first cylinder 3 reaches a pre-set lower limit, detected by sensing means 6, or after a pre-set length of time; and the second grease supply cylinder 3' now provides the sole grease supply to common grease output 10.

To replenish cylinder 3, the following is affected: hydraulic valve 2 is switched, by ROV, to function to return; grease is injected into output line 12 via injection point 7, and refills cylinder 3 until it is determined, by sensing means 6, that the cylinder is sufficiently full; and, once replenished, valve 2 is switched by ROV back to open to function to supply hydraulic fluid, ready for grease control valve 9 to be hydraulically opened when required.

When cylinder 3' runs similarly low, it may be replenished in a corresponding manner, i.e. by switching valve 2' to return, injecting grease into output line 12' to refill cylinder 3', and switching valve 2' opened.

If a multi-cylinder arrangement is used, i.e. utilizing more than two cylinder modules, the above-described cycle of valve opening, grease output co-mingling, and valve closing, may continue for as many cylinder modules as are present in the system.

Figure 2:
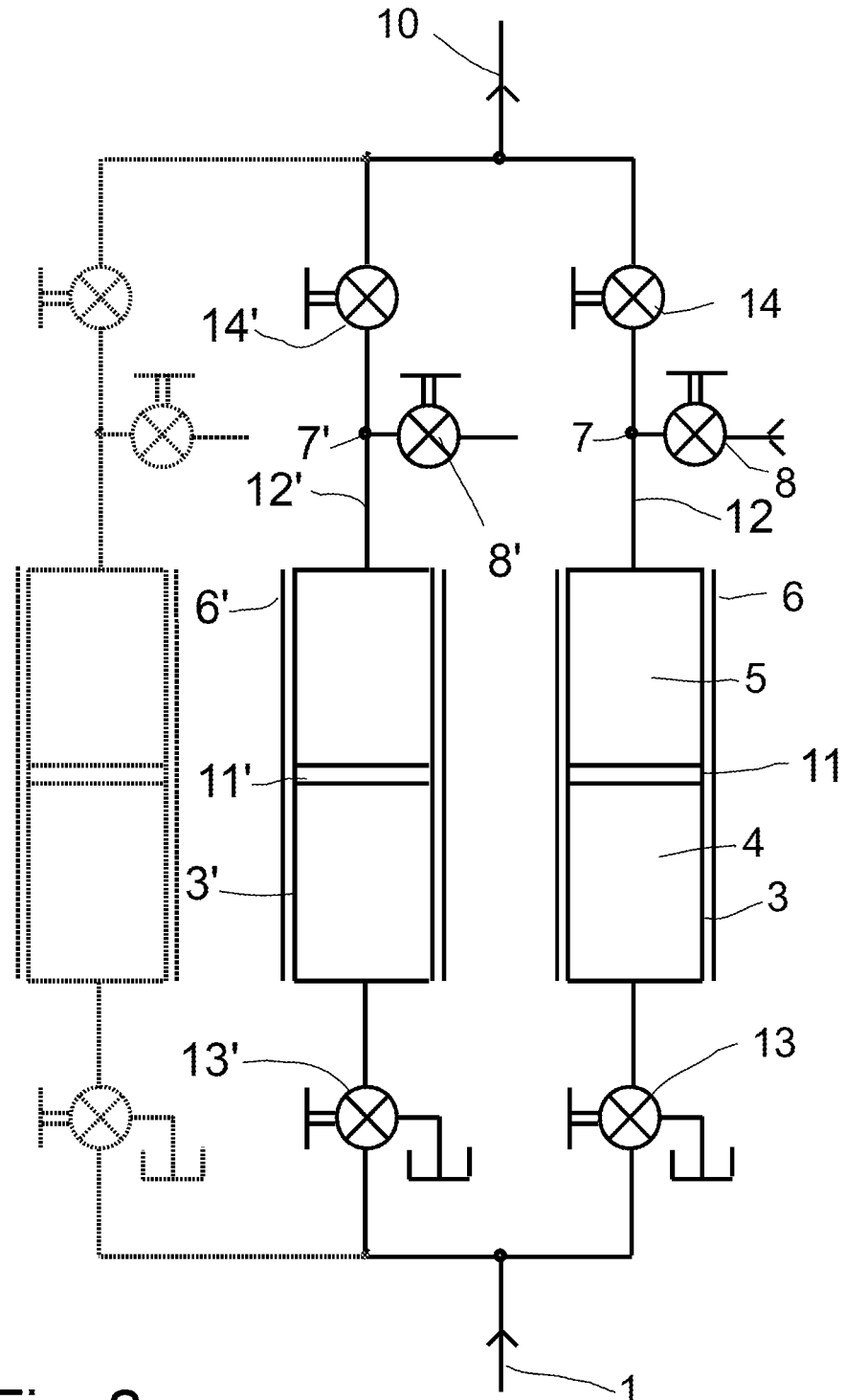
FIG. 2 is a schematic illustration of a grease delivery system using hydraulic control valves according to an embodiment of the present invention.

Another embodiment of the invention is schematically shown in FIG. 2, which essentially differs from that of FIG. 1 in that here hydraulic control valves are used to control switch-over, rather than grease control valves. It is apparent that most of the components of this embodiment are similar to those of FIG. 1, and like numbering has retained where appropriate. However, in this embodiment, ROV-operable valves 2, 2' are replaced by hydraulic control valves 13, 13', and grease control valves 9, 9' are replaced by ROV-operable grease valves 14, 14'. Thus, according to this embodiment, control of the grease supply is affected through hydraulic control valves 13, 13', rather than grease control valves 9, 9'. Here, the hydraulic control valves 13, 13' comprise block and bleed valves, which may be placed into three modes of operation: open (to enable bi-directional flow there through), closed (where flow there through is blocked in both directions), and function to return, in which the hydraulic fluid in cylinder 3 may returned to source (i.e. to the supply 1).

The mode of operation is as follows (again for simplicity a two cylinder module system only is described): i) hydraulic control valve 13 is opened hydraulically to route hydraulic fluid from supply 1 to cylinder 3 under pressure (hydraulic control valve 13' remains closed); ii) grease valve 14 is opened by ROV to allow grease flow through output line 12, conveniently grease valve 14' may also be opened by ROV at this time, (n.b. steps i) and ii) may be effected in either order); iii) the pressurized hydraulic fluid 4 in the cylinder 3 causes grease 5 to be delivered under pressure past injection point 7, through open grease valve 14, and onward to common grease output 10, to be deployed as required; iv) when sensing means 6 indicates that the grease level remaining in cylinder 3 is low, the hydraulic control valve 13' is hydraulically opened; v) for a period of delivery, grease is simultaneously supplied to common grease output 10 from both cylinders 3 and 3' to ensure a seamless supply of grease; vi) the hydraulic control valve 13 is hydraulically placed in the closed mode of operation, to bi-directionally block fluid flow there through, when any one of the following conditions applies: the grease level of first cylinder 3 is exhausted, detected by sensing means 6, the grease level of first cylinder 3 reaches a pre-set lower limit, detected by sensing means 6, or after a pre-set length of time; and vii) the second grease supply cylinder 3' now provides the sole grease supply to common grease output 10.

To replenish cylinder 3, the following is affected: grease valve 14 is closed by ROV; grease valve 13 is placed in the function to return mode of operation; grease is injected into output line 12 via valve 8 and injection point 7, and refills cylinder 3; and once replenished, grease valve 14 is switched by ROV back to open to function to supply hydraulic fluid, ready for hydraulic control valve 13 to be hydraulically opened when required.

It can be seen that in this embodiment, the purpose of ROV-operable grease blocking valves 14, 14' is to enable the grease replenishment operation.

According to these embodiments, ROV operation is only required at start up and to resume grease delivery from a replenished cylinder; normal grease supply changeover is effected hydraulically, so that this can be done almost instantly.

The above-described embodiments are exemplary only, and various other alternatives or modifications will be apparent to those skilled in the art. For example, from a technical viewpoint, any or all of the valves 2, 2', 9, 9', 13, 13', 14, 14' could be ROV-operated or hydraulically piloted. For example, if all the valves were ROV-operated, then the sensing means 6, 6' could simply flag up a message to the surface indicating that the grease is getting low, and the operator would fly in the ROV to close/open the valves as necessary. If all the valves were hydraulically piloted for example, a more sophisticated control system could be put in place, although this would require a greater quantity of hydraulic function lines in the subsea control module (SCM) of the facility.

While the above embodiments have described the use of a hot stab point to enable grease to enter the system for replenishment, as an alternative, such replenishing local grease stores may be permanently plumbed to the system, e.g. to output lines 12. In this case, replenishment is controlled by a physical valve or tap 8, located between the grease store and output line 12, which may be operable hydraulically, electrically or by ROV for example. In this case, each cylinder's injection point 7, 7' . . . may be connected to a common grease source or alternatively to two or more separate grease sources.

In the embodiments described above, sensing means 6 comprises a simple limit switch or position sensor. However, when replenishing cylinder 3 with grease from a supply via injection point 7, it is equally possible to determine the quantity of grease in cylinder 3 by sensing when grease flow from the grease supply stops, using separate flow or pressure sensing means.

In yet another embodiment, co-mingling of the grease within common output line 10 from each cylinder 3, 3' . . . 3" may be facilitated by taking steps to ensure a substantially equal grease output pressure for each cylinder 3, 3' . . . 3". This may be achieved by using a control system enabling differential pressure control of output lines 12, 12' . . . 12". For example, the control system may comprise pressure transducers linked to lines 12, 12' . . . 12" and variable orifice/choke valves in place of valves 9, 9' . . . 9" or 14, 14' . . . 14". These would be linked by a feedback loop and associated logic control in order to regulate the pressure of the grease flow there through, to provide substantially equal grease pressures. These variable valves could still be used to provide blocking functionality as with the previously-described embodiments.

Embodiments of the present invention provide for the following. The local control of grease to injection points, as opposed to known top-side grease delivery systems. Simultaneous grease supply from separate grease cylinders provides seamless grease supply to the grease injection point. There is no risk of there being a period of no grease injection due to a failed instantaneous switching valve or other switching device. In addition, simultaneous grease supply ensures that should a grease switching failure occur, there will be time available for diagnostic fault-finding, rectification, as well as, time available to make the well safe.

What is claimed is:

1. A grease delivery system for delivering grease to a location, the system comprising:
   a first grease reservoir having a first grease output and a first output device configured to output grease from the first grease reservoir;
   a second grease reservoir having a second grease output and a second output device configured to output grease from the second grease reservoir;
   a hydraulic fluid supply fluidly connected to the first and second grease reservoirs, wherein hydraulic fluid from the hydraulic fluid supply displaces grease from the first and second grease reservoirs;
   a common grease output for delivering grease to the location, wherein the common grease output is fluidly connected to the first and second grease outputs; and
   an electronically actuated valve,
   wherein the system is configured to, using the electronically actuated valve, output grease from the first grease reservoir to the common grease output in a first mode, from the second grease reservoir to the common grease output in a second mode, and simultaneously output grease from the first and second grease reservoirs to the common grease output in a third mode.

2. The grease delivery system according to claim 1, further comprising at least one additional grease reservoir having an associated grease output and an associated output device configured to output grease from the at least one additional grease reservoir, wherein the associated grease output is fluidly connected to the common grease output.

3. The grease delivery system according to claim 1, further comprising a grease supply for supplying grease to the first and second grease reservoirs.

4. The grease delivery system according to claim 1, wherein the first grease reservoir is fluidly connected to the hydraulic fluid supply through a first hydraulic fluid valve and the second grease reservoir is fluidly connected to the hydraulic fluid supply through a second hydraulic fluid valve, and wherein the first and second hydraulic fluid valves are configured to at least one of:
   selectively enable hydraulic fluid flow to the respective first and second grease reservoir; and
   to return hydraulic fluid to a hydraulic fluid source.

5. The grease delivery system according to claim 4, wherein the first and second hydraulic fluid valves are further configured to selectively block hydraulic fluid flow to the respective first and second grease reservoir.

6. The grease delivery system according to claim 4, wherein the first and second hydraulic fluid valves are hydraulically-piloted.

7. The grease delivery system according to claim 4, wherein the first and second hydraulic fluid valves are ROV-operable.

8. The grease delivery system according to claim 1, wherein the first and second grease outputs comprise a grease valve configured to selectively allow or block grease flow through the grease valve.

9. The grease delivery system according to claim 8, wherein the grease valves are hydraulically-piloted.

10. The grease delivery system according to claim 8, wherein the grease valves are ROV-operable.

11. The grease delivery system according to claim 1, wherein the first and second grease reservoirs comprise a sensor configured to sense a level of grease within the respective grease reservoir.

12. A well intervention module comprising a grease delivery system in accordance with claim 1, wherein the well intervention module is configured for attachment to an underwater hydrocarbon extraction facility.

13. An underwater hydrocarbon extraction facility comprising the grease delivery system of claim 1.

14. A method for delivering grease to a location using a grease delivery system, the method comprising:
  providing a first grease reservoir having a first grease output and a first output device configured to output grease from the first grease reservoir, a second grease reservoir having a second grease output and a second output device configured to output grease from the second grease reservoir, and a common output for delivering grease to the location, wherein the common output is fluidly connected the first and second grease outputs, a hydraulic fluid supply fluidly connected to the first and second reservoirs;
  outputting grease from the first reservoir through the first grease output in a first mode;
  outputting grease from the second reservoir through the second grease output in a second mode;
  displacing grease from the first and second grease reservoirs using hydraulic fluid from the hydraulic fluid supply; and
  simultaneously outputting grease from each of the first and second reservoirs to the common output for a period of delivery in a third mode.

15. The method according to claim 14, the method further comprising:
  controlling hydraulic fluid flow to each of the first and second reservoirs from the hydraulic fluid supply; and
  controlling grease supply from each of the first and second reservoirs.

16. The method according to claim 14, wherein the first grease reservoir is fluidly connected to the hydraulic fluid supply through a first hydraulic fluid valve and the second grease reservoir is fluidly connected to the hydraulic fluid supply through a second hydraulic fluid valve, and wherein controlling hydraulic fluid flow to each of the first and second reservoirs from the hydraulic fluid supply comprises at least one of:
  to selectively enabling hydraulic fluid flow the respective first and second grease reservoir; and
  returning hydraulic fluid to a hydraulic fluid source.

17. The method according to claim 14, wherein the first and second grease outputs comprise a grease valve, and wherein controlling grease supply from each of the first and second reservoirs comprises selectively allowing or blocking grease flow through the grease valve.

18. The method according to claim 14, wherein the location comprises a pressure control head of intervention equipment for use at an underwater hydrocarbon extraction facility.

* * * * *